Patented Oct. 20, 1936

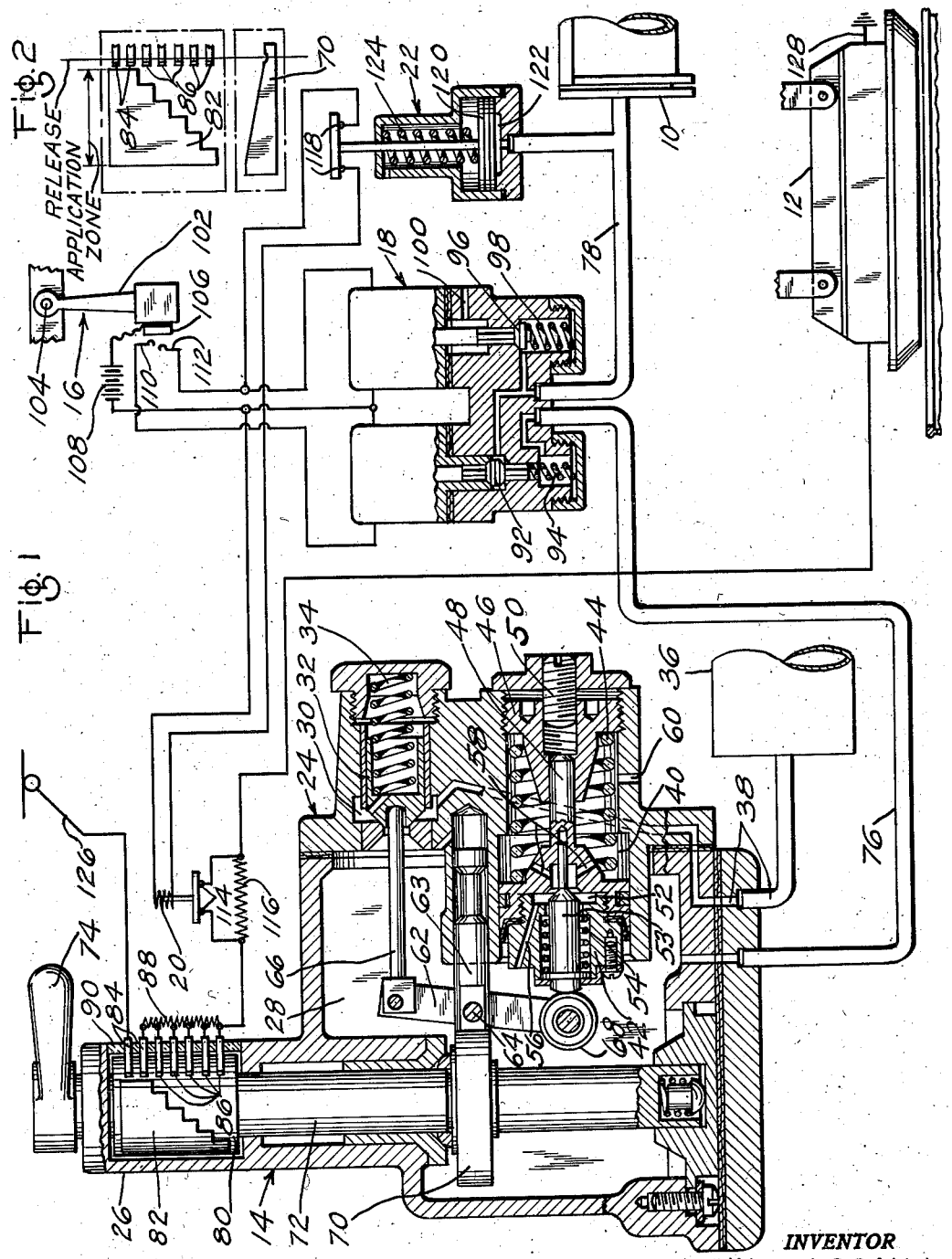

2,058,023

UNITED STATES PATENT OFFICE 2,058,023

BRAKING APPARATUS

John W. Logan, Jr., Edgewood, Pa., assignor to The Westinghouse Air Brake Company, Wilmerding, Pa., a corporation of Pennsylvania Application November 3, 1934, Serial No. 751,302

16 Claims. (Cl. 303—3)

This invention relates to braking apparatus, and more particularly to braking apparatus intended for use with trains or vehicles designed for high speed service.

Where trains or vehicles are intended for use in high speed service, it is essential that a braking apparatus be provided, which will permit the train or vehicle to be brought to a stop at relatively high rates of retardation, so that stops may be made in short distances and fast schedules thereby maintained. Where wheel type brakes alone are employed, such for example as the familiar brake shoe rubbing against the rim of a wheel, the maximum rate of retardation that can be maintained is determined by the adhesion between the wheels and rails.

This adhesion is variable, because track conditions vary, partly due to weather conditions and partly due to foreign matter on the rails. Further, even under good rail conditions, it may not be possible to obtain the adhesion necessary for a desired high rate of retardation. Under such conditions, it is customary to employ another type of brake in connection with the wheel type brake, such for example as the magnetic track shoe brake. The magnetic track shoe brake is not dependent upon adhesion between wheels and rails, and it can, therefore, be applied to a maximum degree without danger of wheel sliding.

It has heretofore been proposed to provide a braking apparatus employing both a wheel type friction brake and a track type brake, in which means have been provided for controlling only the wheel type brake according to a desired rate of retardation, while the track type brake has been applied to a relatively constant degree. The braking force with which the wheel type brake is applied is thus constantly varied, so that the combined braking effect due to both brakes is just sufficient to maintain the desired rate of retardation.

Now it is well known that the coefficient of friction between the rubbing parts of a friction brake increases as the speed of the vehicle decreases, so that the braking effect produced by the parts increases with diminishing speed. The braking force must, therefore, be diminished if a constant rate of retardation is to be maintained.

This increasing braking effect with diminishing speed is a characteristic of both wheel type friction brakes and track shoe brakes. Therefore, if the track shoe brake is applied to a degree so that it is producing a large share of the braking at relatively high speeds, then as the wheel type brake is constantly diminished to some low value as the speed of the vehicle diminishes, the braking effect produced by the track brake may be such as to cause a higher rate of retardation than desired, and hence too abrupt a stop, with great discomfort to the passengers, as well as the danger of producing dangerous shocks in the vehicle or train. It is, therefore, desirable in such cases that means be provided for also diminishing at some low speed, the braking effect produced by the track brake, so that a smooth stop may be made.

It is a principal object of this invention to provide means which will diminish both the wheel type friction brake and the track brake according to a desired rate of retardation, so that a smooth stop relatively free of shocks will result.

Another object of the invention is to provide a braking equipment employing a fluid pressure brake and a magnetic track shoe brake, in which a retardation controller device controls only the fluid pressure brake at relatively high speeds, and after the fluid pressure brake has been released to a predetermined degree by functioning of the retardation controller device, to then control both the fluid pressure brake and the track shoe brake.

Other and more specific objects of the invention will be apparent from the following description, which is taken in connection with the attached drawing; wherein Fig. 1 is a schematic and somewhat diagrammatic view of one embodiment illustrating the invention.

Fig. 2 is a developed view of the magnetic track brake controller, and a cam for operating the fluid pressure brake valve device.

Referring now to the drawing of the embodiment shown, I provide a fluid pressure brake apparatus having a brake cylinder 10 and a magnetic track brake having a magnetic track shoe device 12. A combined brake valve and controller device 14 is provided for controlling the degree of fluid under pressure supplied to the brake cylinder 10 and the degree of energization of the track shoe device 12.

For controlling applications of the two brakes according to a desired maximum rate of retardation, I provide a retardation controller device 16, a magnet valve device 18, and a relay 20. A pneumatic switch device 22 is also provided for preventing control of the track shoe device 12 by the retardation controller device until the brake cylinder pressure will have dropped to some predetermined low value.

Considering now these devices more in detail, the track shoe device 12 may be of any of the types commonly employed, and similarly the mechanism for raising and lowering the track shoe device may be of any of the types now found in common practice.

The brake valve and controller device 14 comprises a self-lapping valve section 24 and a controller section 26. These two sections are embodied in a casing defining a pressure chamber 28.

The self-lapping section 24 is provided with a supply valve chamber 30 having disposed therein a supply valve 32 urged toward a seated position by a spring 34. The valve chamber 30 is in constant communication with a source of fluid under pressure, as for example a reservoir 36, by way of pipe and passage 38, so that when the supply valve 32 is unseated, fluid under pressure may flow from the reservoir to the pressure chamber 28.

The self-lapping section 24 is also provided with a chamber 40 in which is operatively disposed a movable abutment 42 in the form of a piston, subject on one side to pressure from the pressure chamber 28 and on the other side to pressure from a regulating spring 44. Tension of the spring 44 may be regulated by a regulating nut 46, and movement of the movable abutment 42 to the right is limited by engagement of a plunger 48 with an adjustable screw 50.

The movable abutment 42 is provided with a release valve chamber 52 interiorly thereof, in which is disposed a release valve 53 urged toward an unseated position by a spring 54. The chamber 52 is in communication at all times with the pressure chamber 28, by way of passage 55, so that when the release valve 53 is in unseated position, the pressure chamber 28 is in communication with the atmosphere, by way of passage 56, past the unseated release valve 53, passages 58, chamber 40, and port 60.

For actuating the supply valve 32 to unseated position and the release valve 53 to seated position, there are provided spaced levers 62 pivotally secured to and carried by a pivot carrier 63. One of the spaced levers has been removed so as to more clearly show the construction about to be described.

The spaced levers 62 are secured to and spaced on either side of the pivot carrier 62 by a pin 64. Held between the upper ends of the spaced levers is a pin 66 having one end disposed in a recess in the supply valve 32. Rotatably held between the lower ends of the spaced levers is a roller 68, which is normally in engagement with the stem of the release valve 53.

The supply valve spring 34 and the release valve spring 54 urge the spaced levers 62 to the left, so that one end of the pivot carrier 63 engages a cam 70 secured to and disposed on an operating shaft 72. The shaft 72 is adapted to be rotated by a handle 74, which is normally maintained in a "release" position, as diagrammatically indicated in Fig. 2.

The cam 70 has a configuration conforming to the development shown in Fig. 2. In "release" position of the handle 74, the supply and release valves are in the positions indicated in the drawing, and when the handle 74 is moved through the "application zone", shown in Fig. 2, the pivot carrier 63 is actuated to the right. The relation between the springs 34, 54 and 44, is such that the first movement of the pivot carrier 63 causes the release valve 53 to be seated, and subsequent movement causes the supply valve 32 to be unseated. The regulating spring 44 is unappreciably affected by this movement of the pivot carrier 63.

Unseating of the supply valve 32 will effect a supply of fluid under pressure to the pressure chamber 28, and when the pressure acting upon the movable abutment 42 from the pressure chamber compresses the regulating spring 44, the lower ends of the spaced levers 62 move to the right and the upper ends move to the left, about pin 64 as a fulcrum, to permit seating of the supply valve 32. The supply of fluid under pressure to the pressure chamber 28 will then be lapped.

If the pivot carrier 63 is actuated a short distance to the right, supply valve 32 will be unseated only a small amount and the movable abutment 42 will have to move to the right only a corresponding short distance to effect seating of the supply valve. If the pivot carrier 63 is actuated a greater distance to the right, the movable abutment 42 will be required to move a correspondingly greater distance before the supply valve is seated. It will, therefore, be obvious that the degree of pressure established in the pressure chamber 28 corresponds to the degree of movement of the pivot carrier 63 to the right, and hence according to the degree of movement of the handle 74 in the "application zone".

Fluid under pressure supplied to the pressure chamber 28 may flow to the brake cylinder 10, through pipe 76, the magnet valve device 18, and pipe 78.

When the handle 74 is moved in the "application zone", it rotates a drum 80 carrying a drum contact 82, which connects together contact fingers 84 for the first movement of the handle 74, and sequentially engages contact fingers 86 for further movement of the handle 74, to cut out portions of a resistance unit 88. The drum contact 82 is suitably insulated from the drum 80, and the contact fingers 84 and 86 are insulated from each other and from the controller section casing by an insulating member 90.

The magnet valve device 18 is provided with a double beat supply valve 92 urged toward an upper seated position by a spring 94, and toward a lower seated position by action of an electromagnet in the upper part of the valve device casing, which when energized actuates the double beat valve downwardly. When the double beat valve is in upper seated position, fluid under pressure may flow from the pressure chamber 28 in the brake valve and controller device 14, past the open lower seat of the magnet valve device to the brake cylinder 10. When the double beat valve is in lower seated position, this flow is cut off.

The magnet valve 18 is also provided with a release valve 96, which is urged toward seated position by a spring 98, and toward unseated position by action of another electromagnet in the upper part of the valve device casing, which when energized actuates the valve downwardly. When the release valve 96 is in unseated position, a communication is established between the brake cylinder 10 and the atmosphere, by way of exhaust port 100.

The retardation controller device 16 comprises a pendulum 102 preferably suspended from a frictionless pivot 104 and carrying a contact 106 suitably insulated therefrom and connected to a source of current supply, as for example a battery 108. Disposed in the path of movement of the contact 106 are two resiliently supported stationary contacts 110 and 112. These stationary contacts are so disposed that when the vehicle is decelerated, the pendulum 102 swings to the left and contact 106 first engages stationary contact 110, at one rate of deceleration, and subsequently engages contact 112 at another rate.

Contact 110 is connected to one terminal of the electromagnet controlling the double beat valve 92, and contact 112 is connected to one terminal of the electromagnet controlling the release valve 96. The other terminal of these two electromagnets is connected to the opposite terminal of the battery 108, so that when contact 106 engages contact 110, the double beat valve 92 will be seated, when contact 106 engages contact 112, release valve 96 will be unseated.

The relay 20 is provided with two normally closed contacts 114, which shunt a resistance device 116 in a circuit connecting the resistance unit 88 to the track shoe device 12. One terminal of the relay 20 is connected to one terminal of the battery 108, and the other terminal of the relay 20 is connected to the retardation controlled contact 112, through two normally closed contacts 118 of the pneumatic switch device 22.

The pneumatic switch device 22 is embodied in a casing having a piston 120 disposed in a chamber 122 and normally urged to a lowermost position by a spring 124, to hold contact 118 closed. When fluid under pressure is supplied to piston chamber 122, piston 120 is actuated upwardly to open contacts 118.

The operation of this embodiment of my invention is as follows:

When the vehicle is running, the handle 74 is maintained in "release" position, whereupon the parts will be in the positions as shown in the drawing, and as a consequence the brake cylinder 10 will be vented to the atmosphere and the track shoe device 12 deenergized.

When it is desired to effect an application of the brakes, the handle 74 is moved through the "application zone" to a degree according to the desired degree of braking. The track shoe device 12 is energized from a source of electric power through a trolley 126, contacts 114 of relay 20, and a ground connection 128, which may be the track itself or a third rail, to a degree according to the degree of current supplied thereto. The degree of current supplied to the track shoe device is determined by the portion of the resistance unit 88 remaining in the circuit, which is in turn governed by movement of the handle 74.

At the same time as the track shoe brake device is energized, the release valve 53 is seated and the supply valve 32 unseated, so that fluid under pressure flows from the main reservoir 36 to the pressure chamber 28, and from thence to the brake cylinder 10, through the communication heretofore described. The supply to the brake cylinder will be lapped at a pressure corresponding to the degree of movement of the handle 74, as previously explained.

When fluid under pressure flows to the brake cylinder 10, it also flows to chamber 122 in switch device 22, where at a chosen pressure it moves piston 120 to its uppermost position to open contacts 118.

If the combined braking effect produced by the supply of fluid under pressure to the brake cylinder 10 and the energization of the track shoe device 12 is great enough, a time will be reached very shortly where retardation controller pendulum 102 swings far enough to the left for contact 106 to engage contact 110. This energizes the electromagnet controlling the double beat valve 92, whereupon the double beat valve will be urged to lower seated position, to cut off further supply of fluid under pressure to the brake cylinder 10.

With the supply to the brake cylinder lapped and the track shoe device maintained energized, the rate of retardation will increase further, due to the increasing coefficient of friction between the rubbing parts of the wheel brake associated with the brake cylinder, as well as due to a similar increase in the coefficient of friction between the track shoe device and track rail. The pendulum 102 will, therefore, swing further to the left, and contact 106 will engage contact 112. The electromagnet controlling release valve 96 will then be energized and the release valve will be unseated. Fluid under pressure in the brake cylinder 10 will be thus released to the atmosphere, past the unseated release valve 96, and through port 100.

The release of fluid under pressure from the brake cylinder will continue until the rate of retardation has diminished to the point where contact 106 disengages from contact 112. When this takes place, release valve 96 will again be seated, and the release of fluid under pressure from the brake cylinder will be terminated.

As the speed of the vehicle diminishes further, the rate of retardation will again increase, due to the increasing coefficient of friction above referred to, so that the retardation controller pendulum 102 will again move to the left to further release fluid under pressure from the brake cylinder 10.

Now the switch device 22 is designed to maintain contacts 118 open so long as a predetermined brake cylinder pressure exists, but when the pressure in the brake cylinder falls below this predetermined value, the piston 120 will move downwardly far enough to close contacts 118. Therefore, with the retardation controller device intermittently effecting a release of fluid under pressure from the brake cylinder, a point will be reached, corresponding to a very low speed, at which contacts 118 will be closed, and each time the retardation controller contact 106 thereafter engages the stationary contact 112, relay 120 will be energized to open contacts 114.

Opening of contacts 114 will connect the resistance device 116 in the circuit to the track shoe device, so that the energization of the track shoe device will be diminished to a value such that even though the coefficient of friction is increasing rapidly at the low speeds, the rate of retardation will not rise to a value higher than the desired maximum for which the retardation controller device has been designed. In this manner, the vehicle or train will be brought to a smooth stop, without the shock or discomfort which would be attendant if the track shoe device were maintained energized at its high value.

While it might appear that two or more switch devices 22 and relays 20 should be employed to progressively cut resistance devices into the track shoe circuit at different brake cylinder pressures, so as to decrease the energization of the track shoe in steps, this is not at all necessary, because there is an inherent delay in change of current in the exciting windings of the track shoe device, due to the high inductance of these windings, and at the end of the deceleration period contact 106 will be intermittently engaging contact 112 with such frequency that this inherent time delay will operate to effect a smooth stop without requiring resistance to be connected in series with the track shoe windings in steps.

While I have illustrated and described one embodiment of my invention, it is to be understood that I do not wish to be limited to this embodiment, or otherwise than by the spirit and scope of the appended claims.

Having now described my invention, what I claim as new and desire to secure by Letters Patent, is:

1. In a vehicle brake apparatus, the combination with fluid pressure brake means and electric brake means, of means for effecting a supply of fluid under pressure to said fluid pressure brake means, means for effecting a supply of current to said electric brake means, means operated upon a chosen rate of retardation of the vehicle produced by an application of the brakes for diminishing the supply of fluid under pressure to the fluid pressure brake means and for diminishing the supply of current to the electric brake means, and means for preventing diminution of the current supplied to the electric brake means until the supply of fluid under pressure to the fluid pressure brake means has been reduced to a predetermined value.

2. In a vehicle brake apparatus, the combination with a brake cylinder and an electric brake device, of means for supplying fluid under pressure to the brake cylinder, means for effecting energization of the electric brake device, a retardation controller device, means responsive to operation of the retardation controller device at a chosen rate of retardation for releasing fluid under pressure from the brake cylinder, means responsive also to the operation of the retardation controller device for decreasing the energization of the electric brake device, and means for preventing decrease of energization of the electric brake device by the retardation controller device until the brake cylinder pressure has been reduced to a predetermined degree.

3. In a vehicle brake apparatus, the combination with a brake cylinder and an electric brake device, of means for effecting a supply of fluid under pressure to said brake cylinder, means for effecting energization of the electric brake device, a retardation controller device operated according to the rate of retardation of the vehicle, means controlled by said retardation controller device for cutting off the supply of fluid under pressure to said brake cylinder and for releasing fluid under pressure from said brake cylinder, current controlling means controlled by said retardation controller device independently of said last means for effecting a decrease in energization of said electric brake device, and means governed by brake cylinder pressure for controlling said current controlling means.

4. In a vehicle brake system, in combination, a brake cylinder, a magnetic track brake device, means for effecting a supply of fluid under pressure to said brake cylinder, means for effecting energization of said track brake device, a retardation controller device having two normally open contacts, means responsive to closing of one of said contacts for cutting off the supply of fluid under pressure to said brake cylinder, means responsive to closing of the other of said contacts for releasing fluid under pressure from said brake cylinder, means controlled by at least one of said two contacts independently of said cut-off and release means and for decreasing the energization of said track brake device when the brake cylinder pressure has diminished to a predetermined value.

5. In a vehicle brake system, in combination, a brake cylinder, a magnetic track brake device, means for effecting a supply of fluid under pressure to said brake cylinder, means for effecting energization of said track brake device, a retardation controller device having two normally open contacts, means responsive to closing of one of said contacts for cutting off the supply of fluid under pressure to said brake cylinder, means responsive to the closing of the other of said contacts for releasing fluid under pressure from said brake cylinder and for decreasing the energization of said track brake device, and means for preventing decrease of energization of said track brake device above a predetermined brake cylinder pressure.

6. In a vehicle brake system, in combination, a brake cylinder, a magnetic track brake device, a control handle, means for effecting a supply of fluid under pressure to said brake cylinder to a degree according to the degree of movement of said handle, means for effecting energization of said track brake device to a degree also according to the degree of movement of said handle, a retardation controller device, means responsive to operation of said retardation controller device at a chosen rate of retardation for controlling energization of said track brake device, and means operated according to brake cylinder pressure for controlling said last means.

7. In a vehicle brake system, in combination, a brake cylinder, a magnetic track brake device, means for effecting a supply of fluid under pressure to said brake cylinder, means for energizing said track brake device, a normally open control circuit, means responsive to closing of said circuit for decreasing energization of said track brake device, a retardation controller device operable to close said circuit at a chosen rate of retardation, and means operated upon a predetermined brake cylinder pressure for opening said circuit.

8. In a vehicle brake system, in combination, a brake cylinder, a magnetic track brake device, means for effecting a supply of fluid under pressure to said brake cylinder, a circuit for supplying current to energize said track brake device, a resistor in said circuit, a relay for shunting said resistor, a magnet valve device for controlling the supply of fluid under pressure to and its release from said brake cylinder, a retardation controller device for controlling said relay and magnet valve device, and means operated according to brake cylinder pressure for also controlling said relay.

9. In a vehicle brake system, in combination, a brake cylinder, a magnetic track brake device, means for effecting a supply of fluid under pressure to said brake cylinder, means for energizing said track brake device, a retardation controller device having two normally open contacts and operable at one rate of retardation to close one contact and operable at another rate of retardation to close the other of said contacts, means responsive to closing of said first contact for cutting off the supply of fluid under pressure to said brake cylinder, a relay, means responsive to energization of said relay for varying the energization of said track brake device, means responsive to closing of said second contact for effecting energization of said relay and for effecting a release of fluid under pressure from said brake cylinder, and means operated according to brake cylinder pressure for preventing energization of said relay above a chosen brake cylinder pressure.

10. In a vehicle brake system, in combination, a brake cylinder, a magnetic track brake device, a control handle, means responsive to movement of said handle for effecting energization of said track brake device to a degree corresponding to the degree of movement of said handle, means also responsive to movement of said handle for effecting a supply of fluid under pressure to said brake cylinder to a degree also corresponding to the degree of movement of said handle, a retardation controller device operated according to the rate of retardation produced by an application of the brakes, means responsive to operation of said retardation controller device at one rate of retardation for cutting off the supply of fluid under pressure to said brake cylinder, means responsive to operation of said retardation controller device at a higher rate of retardation for decreasing energization of said track brake device and for releasing fluid under pressure from said brake cylinder, and means operated according to brake cylinder pressure for controlling said decrease of energization of said track brake device.

11. In a vehicle brake system, in combination, a brake cylinder, a magnetic track shoe device, a circuit for supplying current to energize said track shoe device, a variable resistor and a fixed resistor in said circuit, a control handle, means responsive to movement of said control handle for varying said variable resistor, a self-lapping valve mechanism for effecting a supply of fluid under pressure to said brake cylinder according to the degree of movement of said control handle, a relay having normally closed contacts shunting said fixed resistor and operable when energized to open said contacts, a second circuit for energizing said relay, a cut-off magnet valve device operable when energized to cut off the supply of fluid under pressure to said brake cylinder, a release magnet valve device operable when energized to release fluid under pressure from said brake cylinder, a retardation controller device operable at one rate of retardation to energize said cut-off magnet valve device and operable at another rate of retardation to energize said release magnet valve device and to connect said second circuit to a source of current supply, and a switch device operated upon a predetermined brake cylinder pressure to open said second circuit.

12. In a vehicle brake system, in combination, a brake cylinder, a track shoe device, means for effecting a supply of fluid under pressure to said brake cylinder, means for energizing said track shoe device, a retardation controller device, a relay, a circuit for energizing said relay and adapted to be closed upon operation of said retardation controller device, means responsive to deenergization of said relay for decreasing energization of said track shoe device, and a switch device operable by brake cylinder pressure to open said circuit at a predetermined brake cylinder pressure.

13. In a brake system, in combination, two brake means, means for effecting operation of both of said brake means simultaneously to produce a combined braking effect, means operated according to a chosen rate of retardation produced by the combined braking effect for decreasing independently the braking effect produced by each of said two brake means, and means for preventing a decrease of the braking effect produced by one of said brake means until the braking effect produced by the other of said brake means has been decreased to a predetermined degree.

14. In a vehicle brake system, in combination, an electric brake device having an inductive winding, a circuit for supplying current to energize said electric brake device, a resistor in said circuit, a switch device for shunting said resistor, a retardation controller device operated according to the rate of retardation produced by an application of the brake device, and means controlled by said retardation controller device for intermittently opening and closing said switch device.

15. In a vehicle brake apparatus, in combination, a brake cylinder, means for supplying fluid under pressure to the brake cylinder, an electric brake device, means for supplying current to operate the electric brake device, means for releasing fluid under pressure from the brake cylinder at a chosen rate of retardation, and means operative upon a predetermined reduction in brake cylinder pressure for reducing the supply of current to said electric brake device.

16. In a vehicle brake apparatus, in combination, a brake cylinder, means for supplying fluid under pressure to the brake cylinder, an electric brake device, means for supplying current to operate the electric brake device, a retardation controller device operated according to the rate of retardation of the vehicle, means responsive to operation of the retardation controller at a chosen rate of retardation for releasing fluid under pressure from the brake cylinder, and means rendered operative at a predetermined brake cylinder pressure for diminishing the degree of current supplied to the electric brake device at said chosen rate of retardation.

JOHN W. LOGAN, Jr.